United States Patent
Cobb et al.

(10) Patent No.: US 10,923,714 B2
(45) Date of Patent: Feb. 16, 2021

(54) STRUCTURES FOR INTERDIGITATED FINGER CO-EXTRUSION

(71) Applicant: PALO ALTO RESEARCH CENTER INCORPORATED, Palo Alto, CA (US)

(72) Inventors: Corie Lynn Cobb, Seattle, WA (US); Ranjeet Rao, Redwood City, CA (US); Scott E. Solberg, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 207 days.

(21) Appl. No.: 15/895,640

(22) Filed: Feb. 13, 2018

(65) Prior Publication Data

US 2018/0175383 A1    Jun. 21, 2018

Related U.S. Application Data

(63) Continuation-in-part of application No. 13/727,937, filed on Dec. 27, 2012, now Pat. No. 9,899,669.

(51) Int. Cl.
*H01M 4/36* (2006.01)
*H01M 4/131* (2010.01)
(Continued)

(52) U.S. Cl.
CPC ............. *H01M 4/366* (2013.01); *B29C 48/18* (2019.02); *B29C 48/19* (2019.02); *B29C 48/21* (2019.02);
(Continued)

(58) Field of Classification Search
CPC ...... H01M 4/366; H01M 4/131; H01M 4/525; H01M 4/1391; H01M 2004/021;
(Continued)

(56) References Cited

U.S. PATENT DOCUMENTS 3,195,865 A    7/1965  Harder
3,382,534 A    5/1968  Veazey
(Continued)

FOREIGN PATENT DOCUMENTS

EP    0802034    10/1997
EP    1757429    2/2007
(Continued)

OTHER PUBLICATIONS

Fergus et al., "Recent Developments in Cathode Materials for Lithium Ion Batteries," Journal of Power Sources, Elsevier SA, Ch. vo. 195, No. 4, Feb. 15, 2010, pp. 939-954, XP026693512.
(Continued)

*Primary Examiner* — Jonathan G Jelsma
*Assistant Examiner* — Omar M Kekia
(74) *Attorney, Agent, or Firm* — Miller Nash Graham & Dunn LLP

(57) ABSTRACT

A structure has a substrate, a first material on the substrate, the first material having a binder and a first active material, periodically located trapezoidal voids that only partially extend from a top of the first active material towards the substrate, and an electrolyte material filling the trapezoidal voids.

6 Claims, 10 Drawing Sheets

(51) Int. Cl.
| | | |
|---|---|---|
| *H01M 4/1391* | (2010.01) | |
| *H01M 4/04* | (2006.01) | |
| *B29C 48/18* | (2019.01) | |
| *B29C 48/19* | (2019.01) | |
| *B29C 48/21* | (2019.01) | |
| H01M 4/525 | (2010.01) | |
| H01M 10/0525 | (2010.01) | |
| H01M 4/02 | (2006.01) | |

(52) U.S. Cl.
CPC ......... *H01M 4/0411* (2013.01); *H01M 4/131* (2013.01); *H01M 4/1391* (2013.01); *H01M 4/525* (2013.01); *H01M 10/0525* (2013.01); *H01M 2004/021* (2013.01)

(58) Field of Classification Search
CPC . H01M 4/0411; H01M 10/0525; B29C 48/18; B29C 48/19; B29C 48/21
USPC .......................................................... 429/209
See application file for complete search history.

(56) References Cited

U.S. PATENT DOCUMENTS

| | | | |
|---|---|---|---|
| 3,556,833 A | 1/1971 | Nirenberg | |
| 3,583,678 A | 6/1971 | Harder | |
| 3,752,616 A | 8/1973 | Matsui et al. | |
| 3,860,036 A | 1/1975 | Newman, Jr. | |
| 4,511,528 A | 4/1985 | Kudert et al. | |
| 5,094,793 A | 3/1992 | Schrenk et al. | |
| 5,143,681 A | 9/1992 | Daubenbuchel et al. | |
| 5,154,934 A | 10/1992 | Okamoto | |
| 5,583,359 A | 12/1996 | Ng et al. | |
| 5,628,950 A | 5/1997 | Schrenk et al. | |
| 5,843,385 A | 12/1998 | Dugan | |
| 5,851,562 A | 12/1998 | Haggard et al. | |
| 5,882,694 A | 3/1999 | Guillemette | |
| 6,109,006 A | 8/2000 | Hutchinson | |
| 6,337,156 B1 * | 1/2002 | Narang ............ H01M 4/13 429/218.1 | |
| 6,676,835 B2 | 1/2004 | O'Connor et al. | |
| 6,981,552 B2 | 1/2006 | Reddy et al. | |
| 7,090,479 B2 | 8/2006 | Kegasawa et al. | |
| 7,690,908 B2 | 4/2010 | Guillemette et al. | |
| 7,700,019 B2 | 4/2010 | Lavoie et al. | |
| 7,765,949 B2 | 8/2010 | Fork et al. | |
| 7,780,812 B2 | 8/2010 | Fork et al. | |
| 7,799,371 B2 | 9/2010 | Fork et al. | |
| 7,883,670 B2 | 2/2011 | Tonkovich et al. | |
| 7,922,471 B2 | 4/2011 | Fork et al. | |
| 7,988,746 B2 | 8/2011 | Chiang et al. | |
| 8,148,009 B2 | 4/2012 | Chiang et al. | |
| 8,168,326 B2 | 5/2012 | Chiang et al. | |
| 8,206,025 B2 | 6/2012 | Natarajan | |
| 8,206,468 B2 | 6/2012 | Chiang et al. | |
| 8,206,469 B2 | 6/2012 | Chiang et al. | |
| 8,241,789 B2 | 8/2012 | Chiang et al. | |
| 8,277,975 B2 | 10/2012 | Chiang et al. | |
| 8,586,238 B2 | 11/2013 | Chiang et al. | |
| 2002/0074972 A1 | 6/2002 | Narang et al. | |
| 2002/0176538 A1 | 11/2002 | Wimberger-Friedl et al. | |
| 2002/0197535 A1 | 12/2002 | Dudley et al. | |
| 2003/0082446 A1 | 5/2003 | Chiang et al. | |
| 2003/0111762 A1 | 6/2003 | Floyd et al. | |
| 2003/0189758 A1 | 11/2003 | Baer et al. | |
| 2005/0053833 A1 * | 3/2005 | Hayashida .......... H01M 4/0404 429/209 |
| 2006/0024579 A1 | 2/2006 | Kolosnitsyn et al. | |
| 2007/0279839 A1 | 12/2007 | Miller | |
| 2010/0003603 A1 | 1/2010 | Chiang et al. | |
| 2010/0239700 A1 | 9/2010 | Winroth | |
| 2011/0064999 A1 | 3/2011 | Chiang et al. | |
| 2011/0070489 A1 | 3/2011 | Chiang et al. | |
| 2011/0110836 A1 | 5/2011 | Rong et al. | |
| 2011/0278170 A1 * | 11/2011 | Chiang ................. G02F 1/1523 204/483 |
| 2012/0031487 A1 | 2/2012 | Kuang et al. | |
| 2012/0153211 A1 * | 6/2012 | Fork ........................ H01B 1/00 252/62.2 |
| 2012/0156364 A1 | 6/2012 | Fork et al. | |
| 2014/0186519 A1 | 7/2014 | Cobb | |
| 2014/0186697 A1 | 7/2014 | Cobb | |
| 2014/0186698 A1 | 7/2014 | Cobb | |
| 2014/0186700 A1 | 7/2014 | Cobb | |

FOREIGN PATENT DOCUMENTS

| | | |
|---|---|---|
| EP | 2056352 | 5/2009 |
| EP | 2249417 A2 | 11/2010 |
| EP | 2466594 | 6/2012 |
| EP | 2750222 A1 | 7/2014 |
| EP | 3193393 A1 | 7/2017 |
| FR | 1308573 | 11/1962 |
| JP | 9183147 | 7/1997 |
| JP | 3585139 B2 | 11/2004 |
| JP | 2006326891 | 12/2006 |
| WO | 0121688 | 3/2001 |

OTHER PUBLICATIONS

European Search Report, dated Apr. 14, 2014, EP Application No. 13198599.6, 7 pages.

Cobb, Code L. and Solberg, Scott E., "Communication-Analysis of Thick Co-Extruded Cathodes for Higher-Energy-and-Power Lithium-Ion Batteries," J. Electrochemical Society, 164(7) A1339-A1341 (2017).

* cited by examiner

STRUCTURES FOR INTERDIGITATED FINGER CO-EXTRUSION

RELATED APPLICATIONS

This application is a continuation-in-part of U.S. patent application Ser. No. 13/727,937, filed Dec. 27, 2012, which is incorporated by reference herein in its entirety.

This application is related to U.S. patent application Ser. No. 12/972,370 filed Dec. 17, 2010, now U.S. Pat. No. 9,004,001 issued Apr. 14, 2015; U.S. patent application Ser. No. 12/972,384 filed Dec. 17, 2010, now U.S. Pat. No. 9,589,692 issued Mar. 7, 2017; U.S. patent application Ser. No. 13/727,960 filed Dec. 27, 2012, now U.S. Pat. No. 9,012,090 issued Apr. 21, 2015; U.S. patent application Ser. No. 13/727,993 filed Dec. 27, 2012, now U.S. Pat. No. 9,590,232 issued Mar. 7, 2017; and U.S. patent application Ser. No. 13/728,016 filed Dec. 27, 2010, now U.S. Pat. No. 9,337,471 issued May 10, 2016.

BACKGROUND

Numerous applications exist in which batteries, fuel cells, electrical interconnects, ultracapacitors and others benefit from tightly spaced interdigitated stripes of dissimilar materials. These materials can be co-extruded using a co-extrusion print head as disclosed in US Patent Publication 2012/0156364, with a similar but alternative print head being shown in U.S. Pat. No. 7,799,371. Being co-extruded in this context mean that the materials are not mixing as they flow. However, the resulting structures have rectangular geometries in cross sectional form with a straight uniform print in the direction perpendicular to the interdigitated geometries.

However, modeling has shown that non-rectangular cross-section geometries have performance enhancement gains in capacity and energy density. Typically, electrodes result from slot coating processes or thin film and semiconductor fabrication techniques. These methods have not yet reached cost effectiveness for large scale production of structured electrodes.

DETAILED DESCRIPTION OF THE EMBODIMENTS

Figure 1:
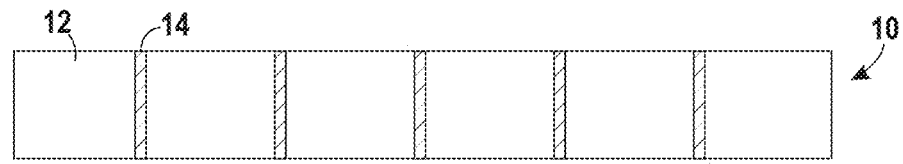
FIG. 1 shows a prior art interdigitated structure.

FIGS. 1-6 show various embodiments of structures formed using a co-extrusion print head such as that shown in U.S. Pat. No. 7,799,371. FIG. 1 shows a prior art embodiment of an electrode structure 10. The structure has a first material 12 in wider portions interdigitated with a second material 14. The material 12 consists of densely packed active electrode material, and the material 14 consists of a highly porous material for enhanced ionic or electrical conductivity. The material 14 may have more or the same electrical conductivity of the first material and will more than likely have higher ionic conductivity.

Figure 4:
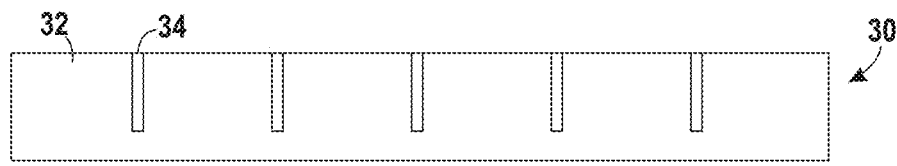
FIG. 4 shows a prior art embodiment of an interdigitated structure.

FIG. 4 shows a similar prior art scenario, except that the regions 34 result from a sacrificial material having been removed. Only the dense regions such as 32 remain. This would allow an electrolyte to file the regions in the embodiment of a battery electrode.

Figure 2:
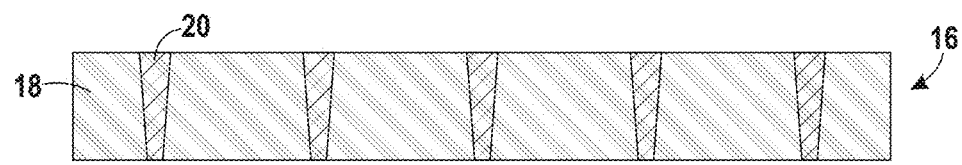
FIGS. 2-3 show embodiments of interdigitated structures.
Figure 3:
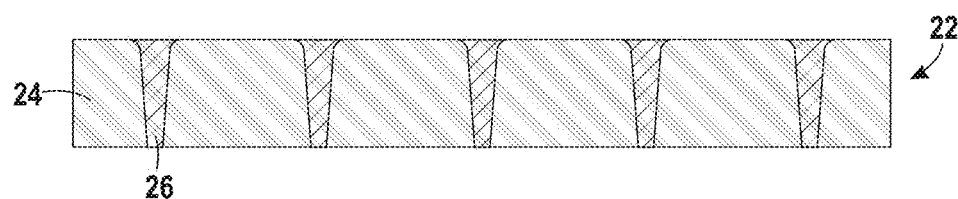

FIGS. 2-3 show densely packed regions 18 and 24, and the porous regions 20 and 26 with non-rectangular cross sections. Through control of the process conditions, such as pressure tuning, fluid flow rates and fluid rheology, the structures 16 and 22 may result. Regarding the fluid rheology, viscosity of the two materials should be matched with similar densities. However, the density may vary because of the concentrations of the conductive materials, but the matching of the viscosities remains important.

The non-rectangular cross sections of regions 18 and 24 allow better control of the concentration gradient across the electrode structures 16 and 22. These structures have more surface area of the densely packed regions exposed to the porous region. Larger concentration gradients across a battery electrode cause a larger ohmic drop, which affects the energy density and power density of a battery cell. By controlling the concentration gradient, one can avoid the large gradients and increase the efficiency of the battery cell. The non-rectangular cross-section may have sharp corners or rounded corners.

Figure 5:
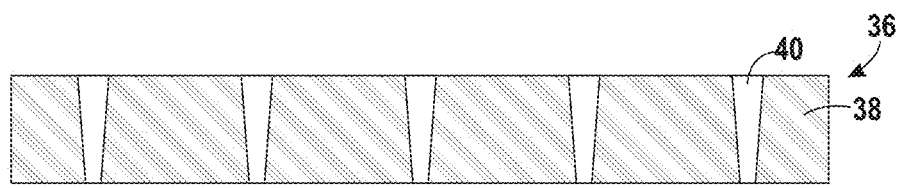
FIGS. 5-6 show embodiments of interdigitated structures.
Figure 6:
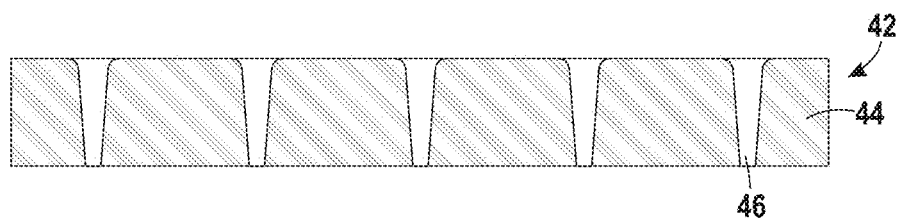

FIGS. 5 and 6 shows similar structures 36 and 42 with non-rectangular regions 38 and 44 of the densely packed material, and non-rectangular spaces such as 40 and 46. In these structures, the spaces would be filled with the electrolyte material, exposing more surface area of the densely packed material to the electrolyte.

Figure 7:
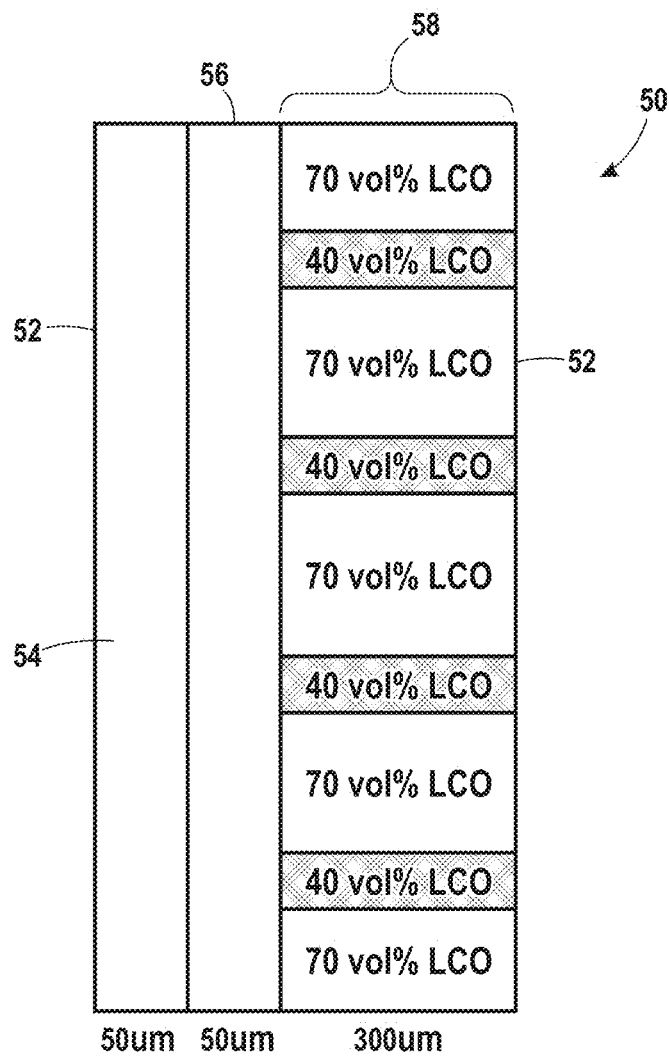
FIG. 7 shows an embodiment of a battery structure.

FIG. 7 shows a simplified block diagram of a battery model used to determine the performance improvement in the non-rectangular electrode cross sections compared to the rectangular cross section embodiments. The structure 50 has current collector boundaries 52. In this embodiment the anode 54 consists of lithium foil having a thickness in the range of 50 micrometers. A separator 56 separates the anode 52 from the cathode structure 58. The cathode structure 58 in this embodiment consists of alternating regions of densely packed and highly porous materials. While the block diagram of FIG. 7 shows these regions as rectangular, they actually have the shape of FIGS. 2 and 3. In this embodiment, the densely packed region consists of lithium cobalt oxide (LCO) at 70% concentration of active material and the highly porous regions consist of 40% concentrations of LCO.

The material may be any type of battery material with any range of active material concentration, but typically the highly porous regions will have less active material than the dense regions. Further, the materials may be used in other structures than batteries. Examples of materials that may be used include lithium cobalt oxide (LCO), lithium nickel cobalt manganese oxide (NCM), or a mixture of the two. Other materials may include lithium nickel cobalt aluminum oxide (NCA), lithium manganese oxide (LMO), or lithium iron phosphate (LFeP). The anode material may be lithium titanate (LTO).

Figure 8:
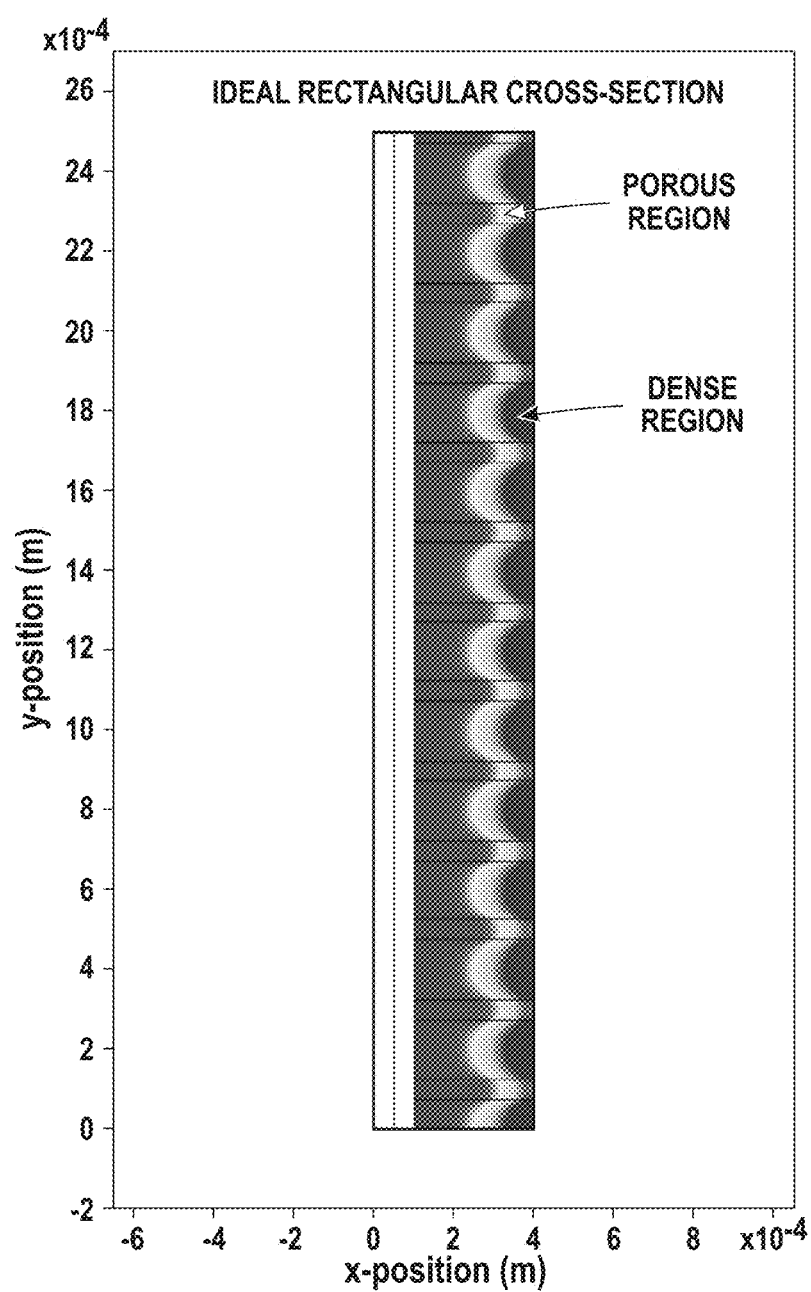
FIGS. 8 and 9 show plots of material utilization for a prior art and a current embodiment of a lithium structure.
Figure 9:
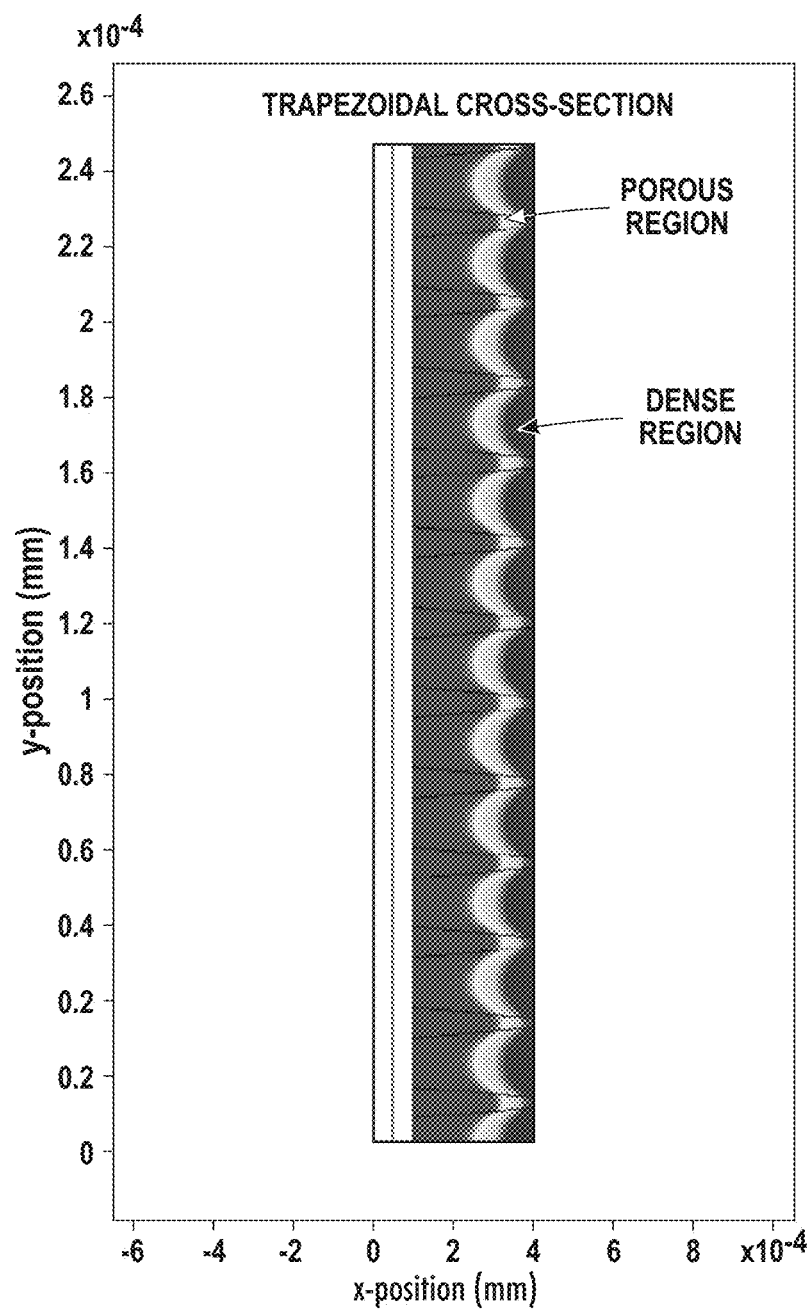

FIGS. 8 and 9 show material utilization plots for the electrode structures of FIG. 1 and FIG. 2 respectively after a '1C' discharge, where the applied current density is 12.9 mA/cm$^2$. A 'C' rate discharge is a measure of the rate at which a battery discharges relative to its maximum capacity. A '1C' rate is the current at which the battery will discharge its entire capacity in 1 hour. Mass and volume are conserved between the porous and dense regions of the structures with the only difference being the geometry of the cross-section. The structure of FIG. 2 has approximately 10% greater active material utilization over the structure of FIG. 1 at the 1C rate.

Figure 10:
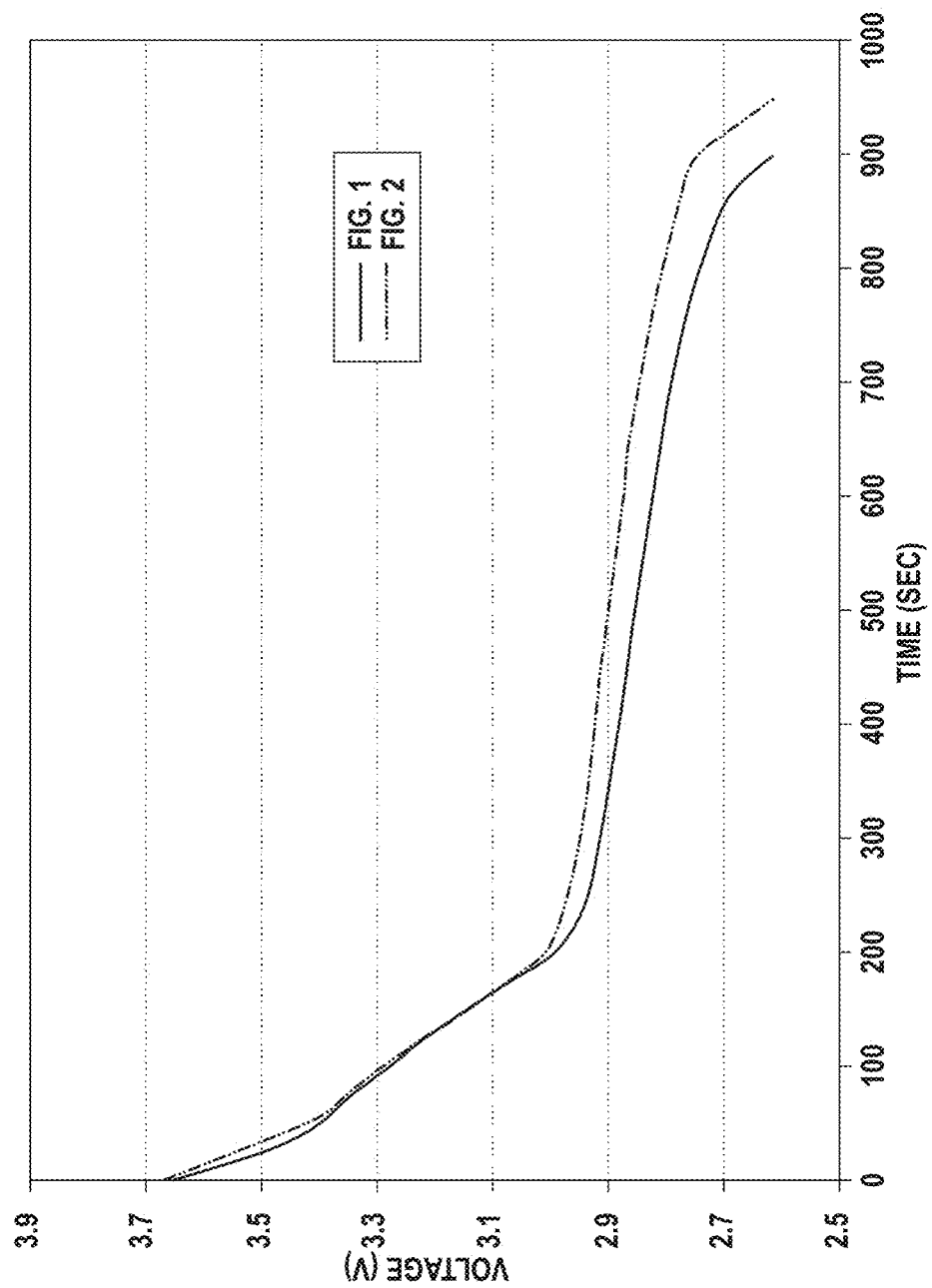
FIG. 10 shows a plot of a discharge performance between prior art and a current embodiment of a lithium structure.

The capacity, energy and power numbers in the table below show the relative performance improvement between the structures but not the absolute performance improvement one can realize for lithium cobalt oxide. FIG. 10 in conjunction with the below table shows the energy, power and capacity gains made using the non-rectangular structure. On the graph in FIG. 10, the upper line is the structure of FIG. 2 and the lower line is the structure of FIG. 1. The plots show that the structure of FIG. 2 has a longer run time and a lower voltage drop than the structure of FIG. 1. This is due to the increase in the active material utilization and the lower concentration gradient in the cathode structure.

|  | Specific Capacity (mAh/g) | Energy Density (Wh/kg) | Power Density (W/kg) |
| --- | --- | --- | --- |
| Non-rectangular | 36.126 | 106.917 | 405.160 |
| Rectangular | 34.225 | 100.318 | 401.273 |
| % Improvement | 5.6% | 6.6% | 1.0% |

As mentioned previously, these gains do not come from higher volume in the structures or more mass, merely from the change in the geometries.

Up to this point, the discussion has focused on the geometrical change of the cross section relative to battery electrode structures. However, as mentioned previously, control of the process parameters may accomplish non-rectangular structures formed by the print head as etch masks and interconnects. In this environment, the structures shown in FIGS. 5 and 6 would make up the material left behind once the sacrificial material is removed. The material could be conductive or polymer, depending upon the purpose of the material in the resulting structure. For example, for circuit interconnects, the material would be conductive, either metal or a conductive polymer, used as contacts after removal of the sacrificial material.

The print head discussed in US Patent Publication 2012/0156364 has what are referred to as 'swept' flow paths, where the edges and corners of the flow paths are angled and/or beveled to alleviate dead spots where material can build up. This built up material may reach a critical mass and then burst into the flow path, or it can cause the flow path to become constricted. In either case, by sweeping the flow paths, the uniformity of the resulting material deposit on a surface is preserved in a straight monolithic pattern. However, by using 'unswept' flow paths, or by pulsing the material flow into the print head using pressure differentials or mechanical motion, one can form more randomized, undulating or 'wavy' flow patterns of the materials onto a surface.

Figure 11:
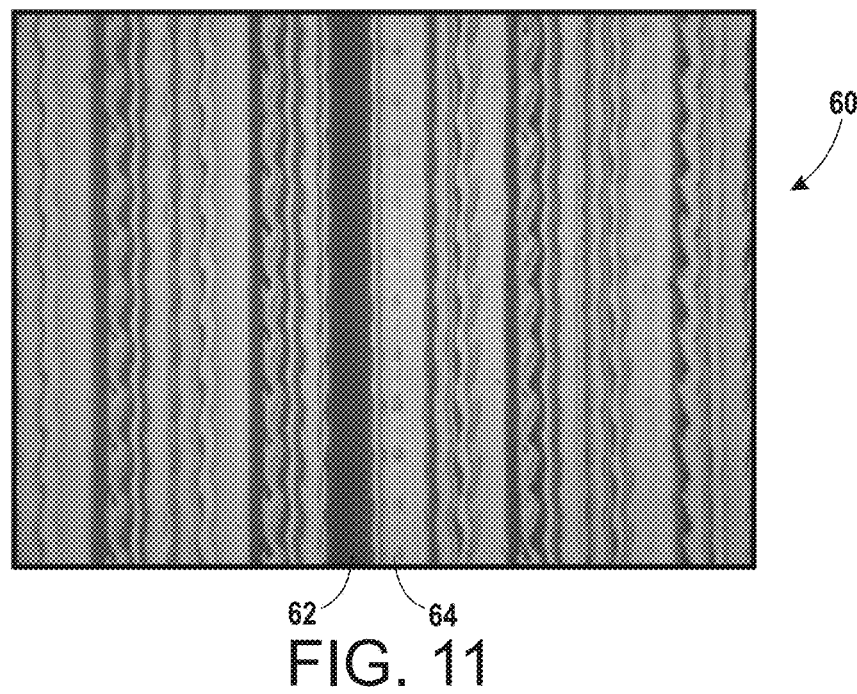
FIGS. 11 and 12 show embodiments of a wavy pattern of extruded materials.

FIG. 11 shows an example of such a randomized material pattern. The resulting deposit consists of wavy lines of the two different materials 62 and 64. As mentioned previously, one of the materials may be removed, acting as a sacrificial material. The voids left by the removal may be filled with a different material. Alternatively, the remaining material may form interconnects and contact pads, or may form an etch mask for an underlying material.

Figure 12:
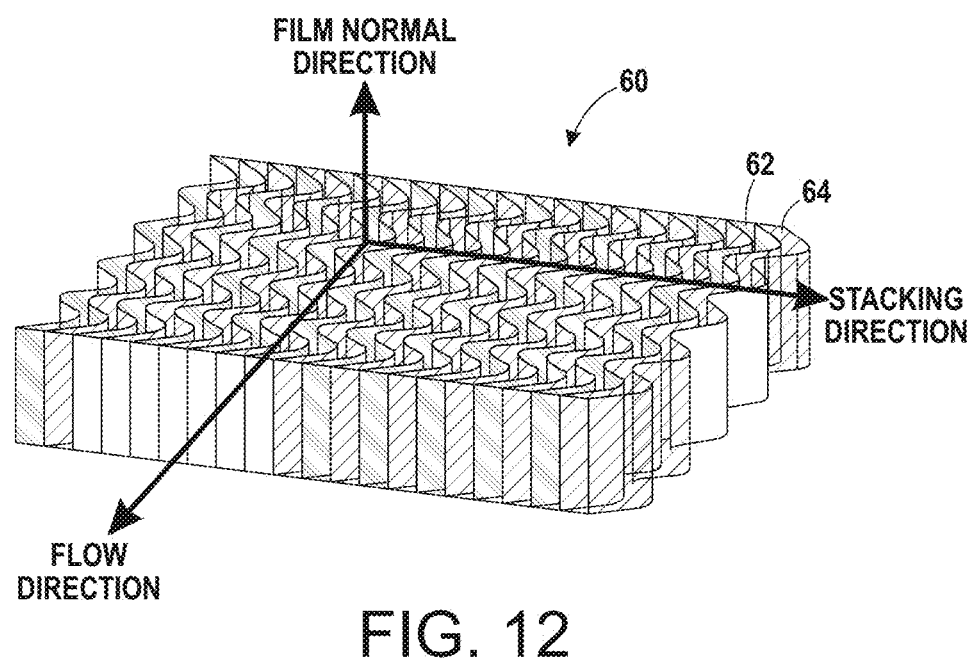

FIG. 12 shows a simplified version of the material pattern. The flow direction is defined as the direction from which the material flows from the print head. The print head would travel from the edge of the pattern closest to the viewer, pulling back away from the viewer. The direction normal to the film would be the top view of the film. The stacking direction refers to the ability of this pattern to be 'stacked' sideways by running the print head in multiple parallel paths to form a much larger pattern by stacking smaller patterns together sideways in the direction shown.

Figure 13:
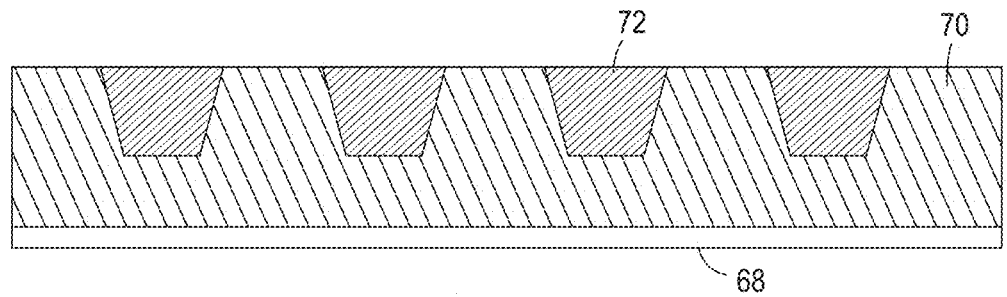
FIG. 13 shows an embodiment of an interdigitated structure having partial, trapezoidal stripes.
Figure 14:
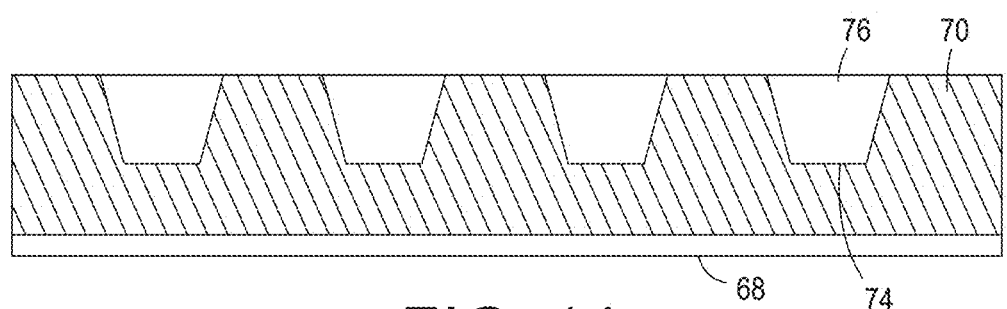
FIG. 14 shows an embodiment of an interdigitated structure having partial, trapezoidal voids.
Figure 15:
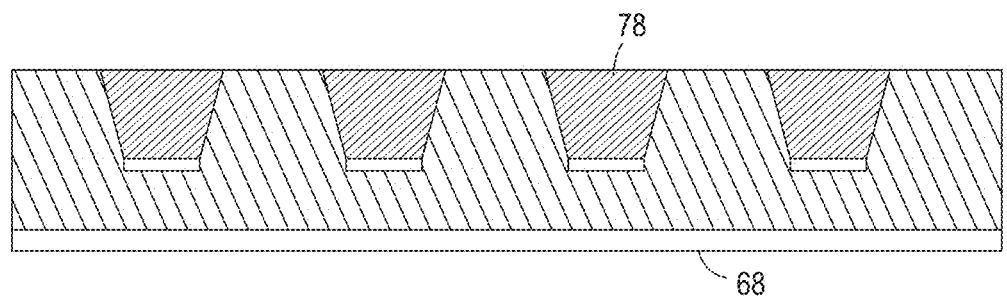
FIG. 15 shows an embodiment of an interdigitated structure having partial, trapezoidal electrolytes.

Other variations on these structures are possible. Like the structure of FIG. 2, one material may have a trapezoidal profile but not extend all the way through the substrate. FIGS. 13-15 show one embodiment of a process of manufacturing a structure. As shown in FIG. 13, a first material 70 is deposited onto a substrate 68, with a second material 72 deposited such that it forms partial, trapezoidal structures. The term 'partial' as used here indicates that the structure formed from material 72 does not reach to the substrate. The embodiments here may consist of structures in which the second material is a partial structure, or structures in which both materials form complete structures.

In the embodiments here, the first material will typically consist of a first active material, a solvent, and a binder. The second material consists of a solvent and a second active material. The relationship between the first and second active materials may take many forms. The first active material may have a higher density than the second material. The two materials may have different porosities, with the first active material having a higher porosity than the second. In addition, the second active material may consist of a more dilute version of the first active material. For example, the second active material may be very similar to the first active material, such as being the same material but in a more dilute solution.

FIG. 14 shows the next part of this embodiment of the process. The structure undergoes drying that removes the second material 72. This removal process will more than likely result in a residue forming on at least one surface of the void 76 formed by removal of the second material. This residue shown as 74.

In FIG. 15, an electrolyte 78 may fill the voids 76 when the structure of FIG. 14 undergoes packaging as a battery. A housing encloses the structure and it fills with electrolyte, including the voids.

Figure 16:
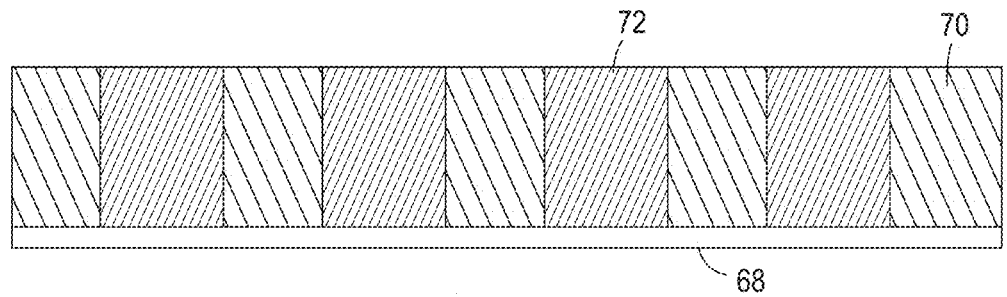
FIG. 16 shows an embodiment of an interdigitated structure having rectangular interdigitated stripes.
Figure 17:
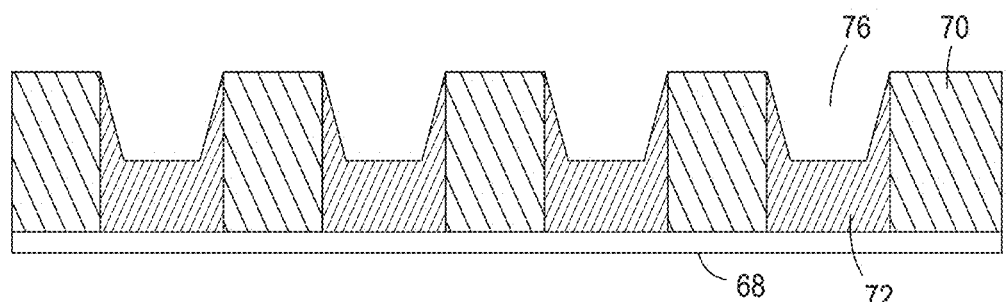
FIG. 17 shows an embodiment of an interdigitated structure having rectangular interdigitated stripes with trapezoidal voids.
Figure 18:
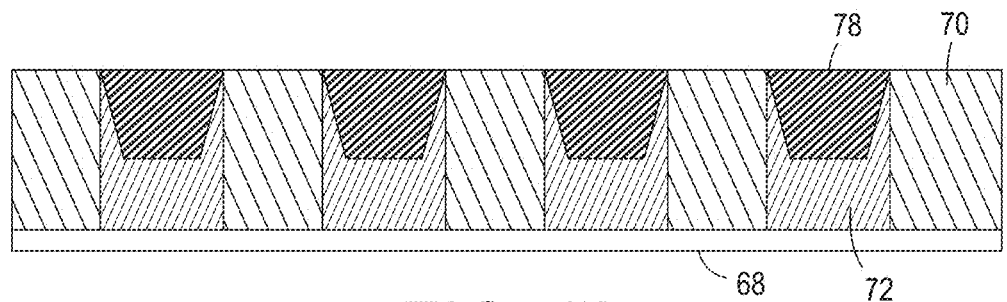
FIG. 18 shows an embodiment of an interdigitated structure having rectangular interdigitated stripes with trapezoidal electrolyte regions.

FIGS. 16-18 show an alternative embodiment. Interdigitated stripes of the first material 70 and the second material 72 are deposited on the substrate 68. These stripes may have square or trapezoidal shapes. The interdigitated structure of FIG. 16 then undergoes drying. This results in the structure shown in FIG. 17. The voids such as 76, form in the second material, rather than in the first material. In FIG. 18, the trapezoidal voids then fill with electrolyte 78.

Figure 19:
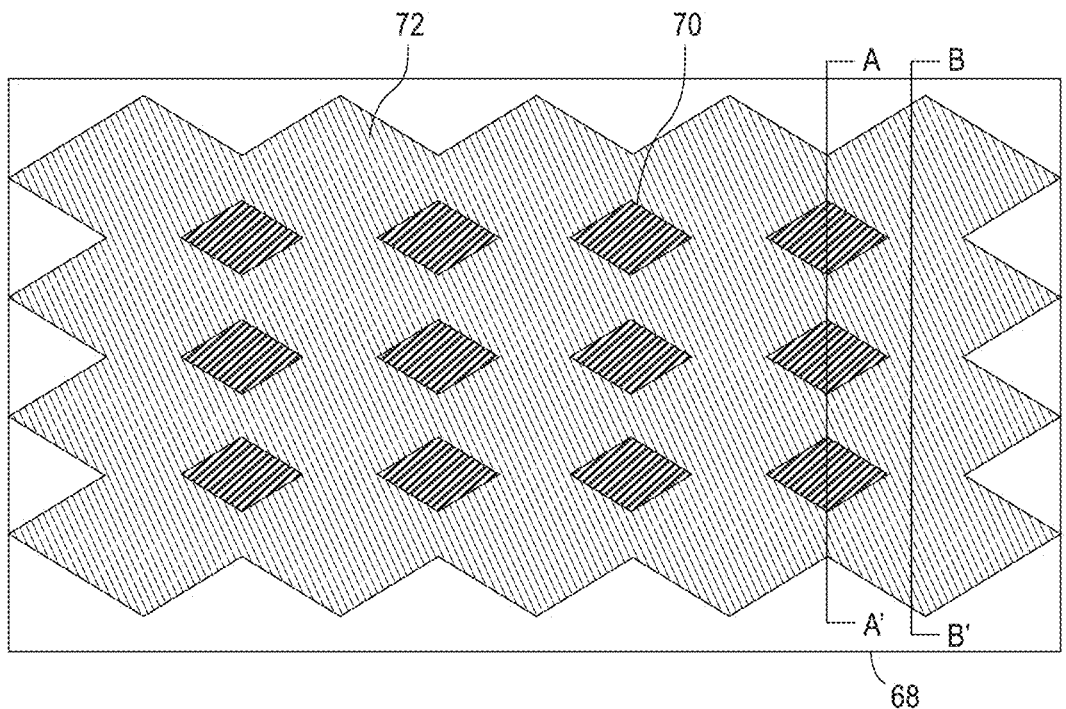
FIG. 19 shows an embodiment of structure having isolated features.

Controlling the pressures used when the materials are being deposited can form the various structures discussed here. Since each material feed is controlled independently, and very often dispensed at different flow rates and pressures, it is possible to manipulate the relative pressures of each material as a print is occurring in order to manipulate the shape and composition of the deposited material. Various control strategies are possible to make a range of structures. This may include turning off the feed of the first material completely to form isolated structures. The second material continues to have the pressure applied that dispenses the second material onto the substrate. This causes the second material to surround the isolated structures during deposition. FIG. 19 shows an embodiment of this intermediate structure in which the isolated structures are formed of the first material 70 surrounded by the sacrificial material 72.

Figure 20:
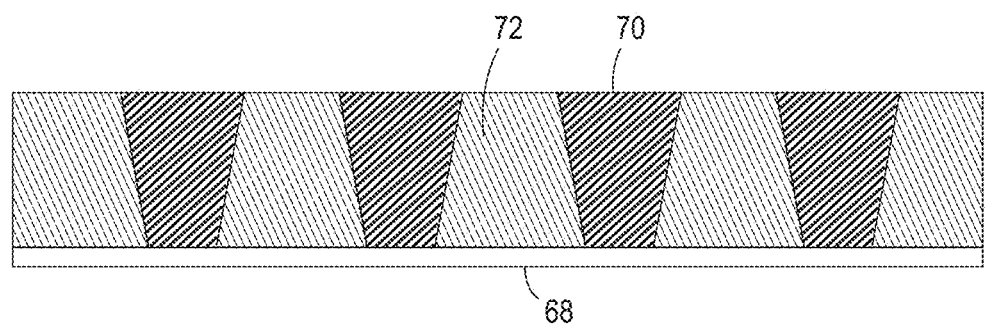
FIG. 20 shows a cross sectional view of a structure having isolated features.

FIG. 20 shows a cross-sectional view along line A-A' in FIG. 19. The first material 70 has regions of the sacrificial material 72 surrounding them. While this structure looks very similar to the previous structures, one should note that a cross section taken at another point in the structure of FIG. 19, such as along line B-B' would only show a solid region of material 72. One should also note that the view of FIG. 19 is a top-down view, so the substrate 68 lies underneath the entire structure.

In this manner, one can form more efficient, higher performing electrode structures for batteries by forming the electrode structures with non-rectangular cross sections. The non-rectangular structures may be formed from pre-existing print heads having swept flow paths through control of the process parameters, or from print heads like the pre-existing print heads, but having 'unswept' paths. Similarly, randomized structures usable as interconnects or randomized etch masks may be formed through process controls using pre-existing print heads or using the print heads with unswept flow paths.

It will be appreciated that several of the above-disclosed and other features and functions, or alternatives thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

What is claimed is:

1. A structure, comprising:
   a substrate;
   a first material on the substrate, the first material having a binder and a first active material, the first material having a top surface opposite from the substrate;
   periodically located voids having trapezoidal cross sections that only partially extend from the top surface of the first active material towards the substrate;
   a second active material residing on at least a portion of an inside surface of the trapezoidal voids, the second active material having a lower density that the first material; and
   an electrolyte material filling the voids.

2. The structure of claim 1, wherein the second active material is a more dilute suspension of the first material.

3. A method of manufacturing a structure, comprising:
   depositing a first material on a substrate, the first material comprising a first active material, a solvent, and a binder, the first active material having a top surface opposite the substrate;
   depositing a second material interdigitated with the first material such that the second material forms trapezoidal structures extending only partially from the top surface of the first material towards the substrate, the second material comprising a second active material and a solvent to form an interdigitated structure with the first material;
   drying the interdigitated structure to remove the solvent from the first material and to partially remove the second material, forming trapezoidal voids extending partially from the top surface of the first material towards the substrate having a trapezoidal cross section leaving at least a portion of an inside surface of the trapezoidal voids coated by the second material; and
   filling the voids with electrolyte.

4. A structure, comprising:
   a substrate;
   a first material on the substrate, the first material having a binder and a first active material, the first material having a top surface opposite from the substrate;
   a second active material interdigitated with the first active material, the second active material having a lower density than the first active material;
   trapezoidal voids in the second active material extending only partially from the top surface towards the substrate; and
   an electrolyte material filling the voids.

5. The structure as claimed in claim 4, wherein the second active material is a more dilute suspension of the first active material.

6. A method of manufacturing a structure, comprising:
   depositing a first material on a substrate, the first material comprising a first active material, a solvent, and a binder, the first active material having a top surface opposite the substrate and the first material reaches the substrate;
   depositing a second material interdigitated with the first material such that the second material forms trapezoidal structures extending from the top surface of the first material to the substrate, the second material comprising a second active material and a solvent;
   drying the interdigitated structure to remove the solvent from the first material and to remove the second material, forming voids extending from the top surface of the first material to the substrate having a trapezoidal cross section; and
   filling the voids with electrolyte.

\* \* \* \* \*